United States Patent
Wiederhold et al.

(10) Patent No.: US 12,486,209 B2
(45) Date of Patent: Dec. 2, 2025

(54) METHOD FOR THE PREPARATION OF 1,2-PROPANEDIOL

(71) Applicant: Evonik Operations GmbH, Essen (DE)

(72) Inventors: Holger Wiederhold, Darmstadt (DE); David Bolz, Frankfurt (DE); Patrik Glatz, Freigericht (DE)

(73) Assignee: Evonik Operations GmbH, Essen (DE)

( * ) Notice: Subject to any disclaimer, the term of this patent is extended or adjusted under 35 U.S.C. 154(b) by 488 days.

(21) Appl. No.: 18/249,695

(22) PCT Filed: Oct. 7, 2021

(86) PCT No.: PCT/EP2021/077662
§ 371 (c)(1),
(2) Date: Apr. 19, 2023

(87) PCT Pub. No.: WO2022/084049
PCT Pub. Date: Apr. 28, 2022

(65) Prior Publication Data
US 2023/0406794 A1 Dec. 21, 2023

(30) Foreign Application Priority Data
Oct. 21, 2020 (EP) .................... 20203029

(51) Int. Cl.
*C07C 29/48* (2006.01)
*C07C 29/80* (2006.01)

(52) U.S. Cl.
CPC .............. *C07C 29/48* (2013.01); *C07C 29/80* (2013.01)

(58) Field of Classification Search
CPC ....... C07C 29/48; C07C 29/80; C07C 31/205; B01J 27/188; B01J 31/0237
See application file for complete search history.

(56) References Cited

U.S. PATENT DOCUMENTS

| | | | |
|---|---|---|---|
| 4,308,409 A | 12/1981 | Wu et al. | |
| 10,214,471 B2 | 2/2019 | Wiederhold et al. | |
| 2018/0354878 A1 | 12/2018 | Wiederhold et al. | |

FOREIGN PATENT DOCUMENTS

| | | |
|---|---|---|
| AU | 2016360386 | 6/2018 |
| CN | 103172495 A | 6/2013 |
| CN | 108779053 A | 11/2018 |
| IN | 109867587 | 6/2019 |
| TW | 201731805 A | 9/2017 |
| WO | 2017/089075 | 6/2017 |

OTHER PUBLICATIONS

Search Report received for Taiwanese Patent Application No. 110138540, mailed on Feb. 26, 2025, 1 page.
Indian Office Action dated Jun. 30, 2023, in Indian Application No. 202347034861, with English translation, 5 pages.
International Search Report dated Feb. 2, 2022, in PCT/EP2021/077662, 5 pages.
Written Opinion dated Feb. 2, 2022, in PCT/EP2021/077662, 7 pages.
U.S. Appl. No. 18/249,984, filed Apr. 21, 2023, Wiederhold et al.
U.S. Appl. No. 18/249,724, filed Apr. 19, 2023, Wiederhold et al.
U.S. Appl. No. 18/249,980, filed Apr. 21, 2023, Wiederhold et al.
U.S. Appl. No. 18/249,584, filed Apr. 19, 2023, Wiederhold et al.
U.S. Appl. No. 18/249,729, filed Apr. 19, 2023, Bolz et al.
U.S. Appl. No. 18/249,908, filed Apr. 20, 2023, Wiederhold et al.
U.S. Appl. No. 18/249,982, filed Apr. 21, 2023, Wiederhold et al.
U.S. Appl. No. 18/249,660, filed Apr. 19, 2023, Wiederhold et al.
U.S. Appl. No. 18/249,906, filed Apr. 20, 2023, Wiederhold et al.
U.S. Appl. No. 18/249,825, filed Apr. 20, 2023, Wiederhold et al.
U.S. Pat. No. 1,214,471, Feb. 26, 2019, 2018/0354878, Wiederhold et al.

*Primary Examiner* — Deborah D Carr
(74) *Attorney, Agent, or Firm* — Grüneberg and Myers PLLC

(57) ABSTRACT

1,2-propanediol is prepared by a method involving reacting propene with hydrogen peroxide at 50 to 110° C. in the presence of a catalyst mixture, containing a phase transfer catalyst and a polytungstophosphate, in a liquid reaction mixture containing an aqueous phase with a maximum apparent pH of 6 and an organic phase. The method then involves separating the reaction mixture into an aqueous phase containing 1,2-propanediol and an organic phase; recycling at least part of the separated organic phase to the reaction; and recovering 1,2 propanediol from the aqueous phase. The method further involves reacting a tungstate with hydrogen peroxide and phosphoric acid at 5 to 40° C., in the presence of the phase transfer catalyst, in a liquid mixture containing an aqueous and an organic phase, followed by passing at least a part of the resulting organic phase containing the polytungstophosphate and phase transfer catalyst to the initial reaction.

20 Claims, No Drawings

METHOD FOR THE PREPARATION OF 1,2-PROPANEDIOL

CROSS-REFERENCE TO RELATED APPLICATIONS

This application is a National Stage entry under § 371 of International Application No. PCT/EP2021/077662, filed on Oct. 7, 2021, and which claims the benefit of priority to European Application No. 20203029.2, filed on Oct. 21, 2020. The content of each of these applications is hereby incorporated by reference in its entirety.

BACKGROUND OF THE INVENTION

Field of the Invention

The present invention relates to a method for the preparation of 1,2-propanediol by reacting propene with hydrogen peroxide.

Description of Related Art

In a well-established process used in the industry, 1,2-propanediol is prepared by reacting propene oxide with water. Propene oxide can be made on an industrial basis using the HPPO process comprising the reaction of propene with hydrogen peroxide in the presence of a titanium zeolite catalyst and an organic solvent. Propene oxide is then isolated and purified prior to the step of reacting it with water to make 1,2-propanediol.

WO 2017/089075 discloses a method for producing 1,2-propanediol from propene and hydrogen peroxide comprising: a) reacting propene with hydrogen peroxide in the presence of a catalyst mixture comprising a phase transfer catalyst and a heteropolytungstate, wherein the reaction is carried out in a liquid mixture comprising an aqueous phase with a maximum pH of 6 and an organic phase, b) dividing the two-phase mixture from step a) into an aqueous phase and an organic phase containing propylene oxide, c) returning the propylene oxide contained in the separated organic phase into the reaction from step a) and d) separating 1,2-propanediol from the aqueous phase separated in step b). The heteropolytungstate and the phase transfer catalyst can be supplied to step a) in mixture, but it is preferred to feed the heteropolytungstate and the phase transfer catalyst separately to step a) as also shown in the examples.

The examples of WO 2017/089075 use a polytungstophosphate and a separate feeding of hydrogen peroxide and of an aqueous solution comprising an alkali tungstate and phosphoric acid to step a). A catalytically active peroxopolytungstophosphate then forms in situ in the reaction mixture of step a).

SUMMARY OF THE INVENTION

The inventors of the present invention have now found that in the method described in WO 2017/089075 the in situ generation of a peroxopolytungstophosphate with high catalytic activity requires a rather high phosphoric acid concentration in the aqueous phase of step a) and that the catalytic activity of the catalyst mixture of WO 2017/089075 deteriorates overtime when the phosphoric acid concentration in the aqueous phase of step a) is low. The inventors have also found that a high and sustained catalytic activity for the oxidation of propene can be achieved even at low concentrations of phosphoric acid in the aqueous phase of step a) if an organic phase containing a peroxopolytungstophosphate is provided by a separate step of reacting a tungstate with hydrogen peroxide and phosphoric acid in the presence of the phase transfer catalyst and this organic phase is then passed to step a) of reacting propene with hydrogen peroxide. This separate step of catalyst activation can also be carried out on organic phase separate in step b) before recycling it to step a).

Subject of the invention is therefore a method for the preparation of 1,2-propanediol comprising:
a) reacting propene with hydrogen peroxide at a temperature of from 50 to 110° C. in the presence of a catalyst mixture comprising a phase transfer catalyst and a polytungstophosphate in a liquid reaction mixture comprising an aqueous phase with a maximum apparent pH of 6 and an organic phase;
b) separating the reaction mixture into an aqueous phase ($P_a$) comprising 1,2-propanediol and an organic phase ($P_o$);
c) recycling at least a part of the separated organic phase ($P_o$) to the reaction step a); and
d) recovering 1,2-propanediol from the aqueous phase ($P_a$);
wherein the method comprises at least one step of
e) reacting a tungstate with hydrogen peroxide and phosphoric acid at a temperature of from 5 to 40° C. in the presence of the phase transfer catalyst in a liquid mixture comprising an aqueous phase and an organic phase, followed by passing at least a part of the resulting organic phase ($P_{oc}$) comprising the polytungstophosphate and phase transfer catalyst to reaction step a).

DETAILED DESCRIPTION OF THE INVENTION

In the method of the present invention, propene is reacted in a step a) with hydrogen peroxide in the presence of a catalyst mixture comprising a phase transfer catalyst and a polytungstophosphate. This reaction is carried out in a liquid reaction mixture which comprises an aqueous phase with a maximum apparent pH of 6 and an organic phase.

Propene can be used in pure form or in a mixture with propane, wherein the proportion of propane may be up to 20 mol %. The proportion of propane in the propene used is preferably less than 5 mol %. Propene is preferably employed in a molar excess to hydrogen peroxide, preferably in a molar ratio of propene to hydrogen peroxide of from 1.1:1 to 10:1.

Hydrogen peroxide is preferably used in the form of an aqueous solution, preferably with a hydrogen peroxide content of 10 to 80% by weight, particularly preferably 30 to 70% by weight. Any commercially available grade of aqueous hydrogen peroxide solutions can be used. A crude hydrogen peroxide product obtained in the extraction stage of the anthraquinone process for producing hydrogen peroxide may also be used.

The catalyst mixture used in step a) comprises a polytungstophosphate. Polytungstophosphates are well known to a person skilled in the art. Preferred polytungstophosphates have a molar ratio of phosphorus to tungsten in the range of from 1:2 to 1:12.

The catalyst mixture used in step a) also comprises a phase transfer catalyst. The phase transfer catalyst comprises a cation or a compound which forms a cation in the aqueous phase, whereby the cation can form a salt with a peroxotungstate or peroxopolytungstophosphate, which salt is soluble in the organic phase of the liquid reaction mixture. The phase transfer catalyst preferably comprises a singly-charged cation or a compound which forms a singly-charged cation in the aqueous phase. Suitable as phase transfer catalyst are tertiary amines, tertiary and quaternary ammonium salts, and quaternary phosphonium salts. Suitable counterions for tertiary and quaternary ammonium salts are the anions chloride, bromide, nitrate, sulphate, hydrogen phosphate, dihydrogen phosphate, methyl sulfonate, methyl sulphate and ethyl sulphate. The phase transfer catalyst is preferably used in an amount which results in a molar ratio in the liquid mixture of phase transfer catalyst to tungsten in the range of from 0.2:1 to 3:1 and particularly preferably of from 0.4:1 to 1:1, where the molar ratio refers to the cations or compounds forming cations in the employed phase transfer catalyst and to the employed amount of tungsten.

In a preferred embodiment, the phase transfer catalyst is a tertiary amine or a tertiary or a quaternary ammonium salt which comprises in total at least 12 carbon atoms, preferably from 12 to 60 carbon atoms. Preferred are tetraalkylammonium salts. Suitable tertiary amines are for example dodecyldimethylamine, hexadecyldimethylamine, octadecyldimethylamine, tributylamine and trioctylamine. Suitable tertiary ammonium salts are the protonation products of these tertiary amines. Suitable quaternary ammonium salts are for example dodecyltrimethylammonium salts, hexadecyltrimethylammonium salts, octa decyltrimethylammonium salts, methyltri butylammonium salts and methyltrioctylammonium salts. More preferably, the phase transfer catalyst comprises a tertiary or quaternary ammonium ion having the structure $R^1R^2R^3NR^{4+}$, wherein $R^1$, $R^2$ and $R^3$ are the same or different and are each selected from alkyl groups having from 8 to 10 carbon atoms and $R^4$ is hydrogen or methyl. Most preferably, the phase transfer catalyst comprises methyltri(octyl/decyl)ammonium methylsulfate (CAS No. 2387913-24-6).

In another preferred embodiment, the phase transfer catalyst comprises at least one salt having a tertiary or quaternary ammonium ion of the structure $R^1R^2R^3R^4N^+$, where $R^1$ is a Y—O(C═O)$R^5$ group with Y being $CH_2CH_2$, $CH(CH_3)CH_2$ or $CH_2CH(CH_3)$ and $R^5$ being an alkyl group or alkenyl group having 11 to 21 carbon atoms,
  $R^2$ is hydrogen or an alkyl group having 1 to 4 carbon atoms, and
  $R^3$ and $R^4$ are each independently $R^1$, an alkyl group having 1 to 4 carbon atoms or Y—OH.
Preferred are quaternary ammonium salts with methylsulphate as the counterion, where $R^2$ is a methyl group and $R^5$ is a linear alkyl group or alkenyl group. Particularly preferred are the salts $(CH_3)_3N^+CH_2CH_2O(C═O)R^5$ $CH_3OSO_3^-$, $(CH_3)_2N^+(CH_2CH_2OH)(CH_2CH_2O(C═O)R^5)$ $CH_3OSO_3^-$, $(CH_3)_2N^+(CH_2CH_2O(C═O)R^5)_2$ $CH_3OSO_3^-$, $CH_3N^+(CH_2CH_2OH)_2(CH_2CH_2O(C═O)R^5)$ $CH_3OSO_3^-$, $CH_3N^+(CH_2CH_2OH)(CH_2CH_2O(C═O)R^5)_2$ $CH_3OSO_3^-$, $CH_3N^+(CH_2CH_2O(C═O)R^5)_3$ $CH_3OSO_3^-$, $(CH_3)_3N^+CH_2CH(CH_3)O(C═O)R^5$ $CH_3OSO_3^-$, $(CH_3)_2N^+(CH_2CH(CH_3)OH)(CH_2CH(CH_3)O(C═O)R^5)$ $CH_3OSO_3^-$ and $(CH_3)_2N^+(CH_2CH(CH_3)O(C═O)R^5)_2$ $CH_3OSO_3^-$, in which $R^5$ is in each case a linear alkyl group or alkenyl group having 11 to 21 carbon atoms. Most preferred is the salt $(CH_3)_2N^+(CH_2CH(CH_3)O(C═O)R^5)_2$ $CH_3OSO_3^-$ in which $R^5$ is an alkyl group or alkenyl group having 11 to 17 carbon atoms. The phase transfer catalysts of this embodiment may be prepared by esterifying ethanolamine, isopropanolamine, diethanolamine, diisopropanolamine, triethanolamine or triisopropanolamine with a fatty acid and subsequent quaternization with dimethyl sulphate. These phase transfer catalysts have the advantage that they are readily biodegradable, unlike tetraalkylammonium salts, and can be introduced into a biological treatment plant without further pretreatment. The salts with methylsulphate as anion are also less corrosive than tetraalkylammonium halides.

The reaction of step a) is carried out in a liquid reaction mixture which comprises two liquid phases, an aqueous phase with a maximum apparent pH of 6 and an organic phase. The term "apparent pH" here refers to a value determined by measurement with a glass electrode employing a commercial pH meter calibrated with aqueous buffer solutions of known pH for measuring dilute aqueous solutions. This apparent pH differs from the notional pH, i.e. the negative logarithm of the hydrogen ion activity, by a constant value because the normal potential of the glass electrode in the aqueous phase of the reaction mixture, which comprises hydrogen peroxide and glycols, is different than the normal potential in pure water. The apparent pH of the aqueous phase is preferably maintained in the range from 1.0 to 3.5, particularly preferably in the range from 2.0 to 3.0. The apparent pH can be maintained in this range by addition of acid, preferably sulphuric acid or phosphoric acid, or by addition of base, preferably aqueous sodium hydroxide solution. Adjusting the apparent pH in the preferred range provides high selectivity for 1,2-propanediol and prevents enriching propene oxide in the aqueous phase, which simplifies the subsequent separation of propylene glycols from the aqueous phase.

In the reaction step a) the weight ratio of hydrogen peroxide to water fed to step a) is preferably adjusted while maintaining a molar excess of propene to hydrogen peroxide fed to step a). The weight ratio of hydrogen peroxide to water is preferably varied within the range of from 0.05 to 1.5, more preferably from 0.10 to 0.7 and most preferably from 0.15 to 0.45. The molar ratio of propene to hydrogen peroxide fed to step a) is preferably from 1.1:1 to 10:1, more preferably from 1.2:1 to 4:1.

The reaction is preferably conducted at a temperature in the range of from 50 to 110° C., more preferably 60 to 100° C. and particularly preferably 70 to 90° C. The reaction pressure is preferably higher than the vapor pressure of propene at the reaction temperature to ensure that most of the propene is present in the liquid organic phase of the liquid mixture.

The reaction of step a) can be carried out with or without addition of an organic solvent. The reaction is preferably conducted in the presence of at least one organic solvent having a boiling point of more than 100° C., preferably more than 120° C., which has a solubility in water of less than 250 mg/kg at 20° C. Suitable as solvents are alcohols having one or more hydroxyl groups, ethers, esters, ketones and alkylated aromatic hydrocarbons. Adding a solvent can improve extraction of a salt formed of the polytungstophosphate and the phase transfer catalyst into the organic phase. Preferably the amount of organic solvent is selected to provide a proportion of organic solvent in the organic phase during the reaction in the range of from 10 to 90% by weight.

In a preferred embodiment, the organic solvent comprises an epoxidized fatty acid methyl ester. The epoxidized fatty acid methyl ester can be formed in situ in the reaction mixture of step a) by employing a fatty acid methyl ester with unsaturated fatty acid groups which reacts with hydrogen peroxide to the epoxidized fatty acid methyl ester. Particularly preferred are epoxidized fatty acid methyl esters which comprise fatty acid groups originating from vegetable oils, in particular soybean oil. The epoxidized fatty acid methyl esters have the advantage that they have low solubility in the aqueous phase.

In another preferred embodiment, the solvent comprises an alkylated aromatic hydrocarbon having 8 to 12 carbon atoms. Suitable alkylated aromatic hydrocarbons are, for example, 1,2-dimethylbenzene (o-xylene), 1,3-dimethylbenzene (m-xylene), 1,4-dimethylbenzene (p-xylene), ethylbenzene, 1,2,3-trimethylbenzene, 1,2,4-trimethylbenzene, 1,3,5-trimethylbenzene (mesitylene), 1-ethyl-2-methylbenzene, 1-ethyl-3-methylbenzene and 1-ethyl-4-methylbenzene and n-propylbenzene. Preferably, hydrocarbon mixtures comprising more than 50% by weight, particularly preferably more than 80% by weight, of alkylated aromatic hydrocarbons having 8 to 12 carbon atoms are used as solvent. The use of these solvents enables extracting most of the peroxotungstates into the organic phase of the reaction mixture and recycling them, which allows for operating the process without a need for recovering polytungstophosphate from the aqueous phase of the reaction mixture of step a). The phase transfer catalyst, the molar ratio of phase transfer catalyst to polytungstophosphate, the molar ratio of phosphorous to tungsten, the molar ratio of propene to hydrogen peroxide and the amount of solvent are then preferably selected to transfer as much as possible of the tungsten present in the liquid reaction mixture into the organic phase.

The reaction of step a) is typically carried out in the presence of phosphoric acid. Phosphoric acid is preferably used in an amount providing an apparent pH of the aqueous phase ($P_a$) of the reaction mixture of from 1.0 to 3.5, preferably of from 2.0 to 3.0. The concentration of phosphoric acid and phosphates in the aqueous phase ($P_a$) of the reaction mixture is preferably from 0.02 to 2.0% by weight, more preferably from 0.2 to 0.8% by weight, calculated as $PO_4^{3-}$ relative to the mass of the aqueous phase.

The reaction of step a) may be carried out in batch or continuously, with a continuous reaction being preferred. The concentration of hydrogen peroxide in the aqueous phase is preferably maintained in the range of 0.1 to 5% by weight, particularly preferably 0.5 to 3% by weight. The concentration of hydrogen peroxide can be adjusted in this range by appropriate selection of the reaction temperature, the molar ratio of propene to hydrogen peroxide and the residence time of the liquid mixture in the reactor in which the reaction takes place. The residence time of the reaction mixture is preferably adjusted to maintain a hydrogen peroxide conversion in the range of from 80 to 99%.

During the reaction, the liquid mixture is preferably mixed in order to generate a large phase interface between the aqueous phase and the organic phase. For this purpose, the reaction is preferably carried out continuously in a loop reactor which has fixed internals in a tubular section and the liquid mixture is passed through the loop reactor at a flow rate which generates a turbulent flow at the internals. Baffles, static mixing elements, structured packings or random packings can be used as internals for this purpose. In combination to these internals or as an alternative, heat exchangers, such as plate heat exchangers or tube bundle heat exchangers, may be used, in which turbulent flow is generated, for example between the plates of a plate heat exchanger or in the tubes of a tube bundle heat exchanger.

Preferably, all or a part of the reaction heat generated in step a) is removed while the reaction proceeds, preferably by cooling the reaction mixture in a heat exchanger. More preferably, the reaction is carried out continuously in a loop reactor which comprises a heat exchanger within the reactor loop for cooling the reaction mixture.

In step b) of the method of the present invention, the liquid reaction mixture provided by step a) is separated into an aqueous phase ($P_a$) comprising 1,2-propanediol and an organic phase ($P_o$). The separation of the two-phase reaction mixture provided by step a) is preferably carried out in a settler vessel. The two-phase reaction mixture is preferably passed through a coalescer element comprising a structured packing or a random packing with a surface wetted by the dispersed phase of the two-phase mixture in order to achieve a more complete separation.

The aqueous phase ($P_a$) typically comprises water, unreacted hydrogen peroxide and the reaction product 1,2-propanediol. The aqueous phase typically also contains dipropylene glycol and tripropylene glycol as well as reaction byproducts, such as 1-hydroperoxy-2-propanol and 2-hydroperoxy-1-propanol formed by reaction of propene oxide with hydrogen peroxide, and formic acid, acetic acid and hydroxyacetone formed by further oxidation of 1,2-propanediol. The aqueous phase typically also comprises phosphoric acid and may further contain sodium salts of phosphoric acid if sodium tungstate is added in step e). The organic phase ($P_o$) comprises unreacted propene and propene oxide that is formed as intermediate when propene is reacted with hydrogen peroxide and has not been hydrolyzed to 1,2-propanediol. The organic phase ($P_o$) typically also comprises one or more salts formed of the polytungstophosphate and the cation of the phase transfer catalyst. The organic phase $P_o$ will also comprise propane, if the propene starting material contains propane, and organic solvent, if an organic solvent having a low solubility in water is used as described further above.

In step c) of the method of the present invention, at least a part of the separated organic phase ($P_o$) is recycled to the reaction step a). Thereby, propene oxide present in the organic phase ($P_o$) is recycled to step a) in order to achieve a complete conversion of propene to 1,2-propanediol, dipropylene glycol and tripropylene glycol. Preferably, the polytungstophosphate present in the organic phase ($P_o$) is recycled into step a), and it is particularly preferred to recycle substantially all of the catalyst mixture that is present in the organic phase into step a).

The organic phase ($P_o$) separated from the liquid reaction mixture provided by step a) may be recycled to step a) without further treatment. If the propene fed to step a) contains propane, it is preferred to separate a stream of unreacted propene from the organic phase in step c) before the organic phase is recycled to step a), with the separated stream of unreacted propene containing as much propane as the impure propene fed to step a). This way, an accumulation of propane in the organic phase of the reaction mixture of step a) can be avoided for a continuous reaction. The separated stream of unreacted propene may be passed to a C3 splitter for separating propene and propane and the recovered propene may be recycled to step a).

The aqueous phase ($P_a$) obtained in step b) is preferably further processed without recycling any part of it directly or indirectly to step a).

In step d) of the method of the present invention, 1,2-propanediol is recovered from the aqueous phase ($P_a$), preferably by distillation. Preferably, 1,2-propanediol and higher propylene glycols, like dipropylene glycol and tripropylene glycol, are recovered by a sequence of distillation steps, such as a multi-step distillation with the first distillation step and optionally further distillation steps providing an overhead product comprising water and a bottoms product which is passed to the next distillation step, and a distillation step providing an overhead product comprising 1,2-propanediol and a residuals bottoms product which is preferably subjected to at least one further distillation step. Most preferably, a sequence of distillation steps as described in Ullmann's Encyclopedia of Industrial Chemistry, online edition, entry "Propanediois", page 4, DOI 10.1002/14356007.a22_163.pub2 is used where an overhead product comprising water is separated from a bottoms product comprising 1,2-propanediol and higher propylene glycols in a series of two to four heat integrated distillation steps, followed by a vacuum distillation step which provides 1,2-propanediol as the overhead product and a bottoms product containing higher boiling organic compounds and salts. From this bottoms product, dipropylene glycol and tripropylene glycol may be recovered as overhead products in further vacuum distillation steps.

In a preferred embodiment, at least a part and preferably all of the aqueous phase ($P_a$) obtained in step b) is subjected to a catalytic hydrogenation in step d) prior to recovering 1,2-propanediol, preferably by distillation. The hydrogenation is preferably carried out using a supported hydrogenation catalyst comprising one or more metals from the group of Ru, Rh, Pd, Pt, Ag, Ir, Fe, Cu, Ni and Co on a support, wherein activated carbon, $SiO_2$, $TiO_2$, $ZrO_2$, $Al_2O_3$ and aluminium silicates are preferred as support materials. Preference is given to hydrogenation catalysts comprising ruthenium as active metal. The catalytic hydrogenation is preferably carried out at a temperature of from 80° C. to 140° C., preferably from 90° C. to 120° C., and preferably at a partial hydrogen pressure of 5 to 50 bar, more preferably 5 to 35 bar, even more preferred 7 to 30 bar, most preferred 8 to 25 bar. The hydrogenation catalyst may be used as a suspension or as a fixed bed, a trickle bed hydrogenation with a fixed bed catalyst being preferred. The hydrogenation can prevent problems caused by decomposition of hydrogen peroxide, which has not reacted in step a), when 1,2-propanediol is recovered by distillation. The hydrogenation also converts the by-products 1-hydroperoxy-2-propanol, 2-hydroperoxy-1-propanol and hydroxyacetone formed in step a) to 1,2-propanediol and thereby improves the yield of 1,2-propanediol.

The method of the present invention also comprises at least one step e) of reacting a tungstate with hydrogen peroxide and phosphoric acid at a temperature of from 5 to 40° C. in the presence of the phase transfer catalyst in a liquid mixture comprising an aqueous phase and an organic phase. At least a part and preferably all of the resulting organic phase ($P_{oc}$) comprising the polytungstophosphate and phase transfer catalyst is then passed to reaction step a). Preferably, also at least a part of the aqueous phase ($P_{ac}$) resulting in step e) is passed to reaction step a).

Phosphoric acid and the tungstate are preferably employed in step e) at a molar ratio of phosphorus to tungsten in the range of from 1:2 to 10:1, preferably from 4:1 to 8:1. The aqueous phase of the liquid mixture of step e) preferably comprise from 10 to 40% by weight, more preferably 15 to 38% by weight and most preferred 18 to 35% by weight of phosphoric acid. Hydrogen peroxide is preferably used in an amount providing at least 2 mol hydrogen peroxide per mol tungsten, preferably from 2 to 10 mol hydrogen peroxide per mol tungsten. It is believed that the preferred molar ratio of phosphorus to tungsten and hydrogen peroxide to tungsten and the preferred concentration of phosphoric acid in the aqueous phase convert most of the tungstate to peroxotungstophosphates of formula $PO_4[WO(O_2)_2]_4^{3-}$ and $HPO_4[WO(O_2)_2]_2^{2-}$ as well as partially protonated forms thereof, which are presumably the catalytically most active species for oxidizing propene. The temperature of from 5 to 40° C. used in step e) prevents decomposition and formation of molecular oxygen from these species before they are passed to reaction step a). Preferably, step e) is conducted at a temperature of from 10 to 35° C., more preferably 15 to 30° C.

The reaction time in step e) is typically from 1 to 200 min, preferably 1 to 20 min and more preferably 2 to 10 min, with reaction times of less than 20 min being preferred at the upper end of the temperature range of from 5 to 40° C. if the liquid mixture of step e) comprises propene. Only a small part of propene present in the liquid mixture of step e) will then be oxidized, step e) can be carried out without cooling and essentially all of the peroxotungstophosphates generated in step e) can be passed to step a).

In step e), the tungstate is preferably reacted with hydrogen peroxide and phosphoric acid in the presence of an organic solvent having a boiling point of more than 100° C. at atmospheric pressure and a solubility in water at 20° C. of less than 250 mg/kg. The same organic solvents described above as suitable for step a) of reacting propene with hydrogen peroxide may be used in step e). The organic solvent preferably comprises more than 50% by weight and more preferably more than 80% by weight of alkylated aromatic hydrocarbons having from 8 to 12 carbon atoms.

Step e) may be carried out in any kind of reactor known to be suitable for mixing the two liquid phases present in step e). Suitable reactors for carrying out step e) are stirred vessels as well as the reactor types described further above for providing a large phase interface between the aqueous phase and the organic phase in step a). For short reaction times in step e), pipe reactors with fixed internals for creating turbulent flow may also be used.

Preferably, at least a part of the organic phase ($P_o$) separated in step b) is used as a tungstate source for step e), followed by passing the resulting organic phase ($P_{oc}$) to reaction step a) to provide for the recycling of step c). More preferably, steps a), b), c) and e) are carried out continuously and from 5 to 50%, preferably 10 to 25%, of the organic phase ($P_o$) separated in step b) is passed to step e) with the remainder being recycled directly to step a). This way, the most catalytically active peroxotungstophosphate species can be continuously regenerated and step a) can be operated continuously over a long time period without a loss in catalytic activity, i.e. with constant hydrogen peroxide conversion, even at a low concentration of phosphoric acid in the aqueous phase of reaction step a). If the organic phase ($P_o$) separated in step b) comprises unreacted propene, the reaction of step e) is preferably carried out with a short reaction time as described further above to avoid oxidation of the propene introduced with the organic phase ($P_o$), so there will be no need for cooling the liquid mixture in step e). For this reason, it is also preferred not to add propene in step e).

In a preferred embodiment, at least a part of the organic phase ($P_o$) separated in step b) is used as a tungstate source for step e) and step e) is operated with a volume ratio of organic phase to aqueous phase of from 50:1 to 1:1, preferably from 20:1 to 5:1, more preferred 14:1 to 8:1. In this embodiment, preferably the entire aqueous phase ($P_{ac}$) resulting in step e) is passed to reaction step a) and then no phase separation of the organic phase ($P_{oc}$) and the aqueous phase ($P_{ac}$) resulting in step e) is necessary. When the entire aqueous phase ($P_{ac}$) resulting in step e) is passed to reaction step a), preferably all of the phosphoric acid employed in reaction step a) is introduced in step e).

In another preferred embodiment, at least a part of the organic phase ($P_o$) separated in step b) is used as a tungstate source for step e) and step e) is operated with a volume ratio of organic phase to aqueous phase of less than 10:1, preferably from 7:1 to 0.1:1. In this embodiment, the aqueous phase ($P_{ac}$) and organic phase ($P_{oc}$) resulting in step e) are separated and a part of the separated aqueous phase ($P_{ac}$) is reused as a phosphoric acid source for step e). The part of the separated aqueous phase ($P_{ac}$) which is not reused as a phosphoric acid source for step e) is preferably passed to reaction step a). When steps a) and e) are carried out continuously, the fraction of the separated aqueous phase ($P_{ac}$) which is reused as a phosphoric acid source for step e) is preferably adjusted to maintain a constant volume of the aqueous phase of the liquid mixture of step e), i.e. the fraction of the separated aqueous phase ($P_{ac}$) which is not reused but discharged from step e) will discharge the water introduced with the hydrogen peroxide and the phosphoric acid used in step e). Separation of the aqueous phase ($P_{ac}$) and the organic phase ($P_{oc}$) in step e) may be carried out as described above for step b).

For both these preferred embodiments and a continuous operation of steps a), b), c) and e) it is preferred to introduce additional tungstate and preferably also phase transfer catalyst into step e) at the same rate as they leave in step b) with the aqueous phase ($P_a$) in order to maintain a constant amount of phase transfer catalyst and of polytungstophosphate in the liquid reaction mixture of step a).

The present invention will now be explained in more detail with reference to examples.

EXAMPLES

Example 1

Preparation of Initial Epoxidation Catalyst Solution

A mixture of 29 g 70% by weight hydrogen peroxide, 94 g demineralized water, 78 g 85% by weight phosphoric acid and 48 g sodium tungstate dihydrate was stirred for 2 h at room temperature. Then, a solution of 82 g of methyltri (octyl/decy)ammonium methylsulfate (CAS No. 2387913-24-6) in 884 g Hydrosol A 200 ND (a mixture of C10 alkyl benzenes) was added and the mixture was stirred for another 2 h at room temperature. The aqueous and organic phases were then separated to provide 995 g of organic phase as initial epoxidation catalyst solution.

Reaction of Propene with Hydrogen Peroxide

The reaction of propene with hydrogen peroxide was carried out at a temperature of 80° C. and a pressure of 30 bar in a loop reactor with a loop volume of 0.45 l, a circulation pump and a heat exchanger for adjusting the reaction temperature, which was operated at a circulation rate of 130 kg h$^{-1}$. The reactor was equipped with a catalyst feed reservoir, an organic phase collection vessel equipped with a stirrer, and feed pumps for feeding liquid propene, liquid propane, an aqueous hydrogen peroxide solution and liquid from the catalyst feed reservoir. The initial epoxidation catalyst solution was charged to the catalyst feed reservoir and the aqueous phase which had been separated from the initial epoxidation catalyst solution was charged to the organic phase collection vessel. The loop initially contained reaction mixture from a previous experiment. Circulation was started and maintained at 130 kg h$^{-1}$ and the circulating mixture was heated to 80° C. Then 80 g h$^{-1}$ of propene, 50 g h$^{-1}$ of propane, 210 g h$^{-1}$ of a 15% by weight aqueous hydrogen peroxide solution containing 0.05% by weight phosphoric acid, and 320 g h$^{-1}$ of organic catalyst solution from the catalyst feed reservoir were introduced into the loop reactor, cooling the circulating mixture to maintain a reaction temperature of 80° C. A two-phase oxidation reaction mixture was removed from the loop reactor in an amount corresponding to the amounts added and 18 g h$^{-1}$ of a 9% by weight aqueous disodium sulfate solution was added to this mixture at the reactor outlet to speed up phase separation. The organic phase and the aqueous phase of the resulting mixture were separated, and the organic phase was passed to the organic phase collection vessel after depressurizing and cooling to 25° C. When 500 g of the organic phase had accumulated in the organic phase collection vessel, the content of the vessel was thoroughly mixed by stirring for 5 min at 25° C., phases were separated by settling and the organic phase was passed to the catalyst feed reservoir with the aqueous phase remaining in the organic phase collection vessel. After about 7 h of operation, the feeding of reactants and the circulation in the loop reactor were stopped and 0.33 g of sodium tungstate dihydrate were charged to the organic phase collection vessel to compensate for losses. The next day, circulation in the loop reactor was restarted, dosing of reactants was resumed after the reaction temperature had been established in the loop reactor and the reaction was continued for another about 7 h, operating the process for a total of 32.4 h over a 5-day period. The aqueous phase separated from the oxidation reaction mixture was analyzed for hydrogen peroxide by redox titration and for 1,2 propanediol (MPG) by capillary GC (25 m CP-WAX-52 CB column from Agilent, He carrier gas, temperature program starting at 50° C. with ramps of 20 K/min to 90° C., 10 K/min to 220° C. and 5 K/min to 235° C., FID detector) and $^1$H-NMR after different periods of time. The data are summarized in table 1.

Example 2 (Comparative)

Example 1 was repeated but without charging the aqueous phase, which had been separated from the initial epoxidation catalyst solution, to the organic phase collection vessel, i.e. without performing step e) of the process according to the present invention. The data from this example are also summarized in table 1.

TABLE 1

Concentration of hydrogen peroxide and 1,2-propanediol in the aqueous phase separated from the oxidation reaction mixture (all values in % by weight)

| | Example 1 | | Example 2 (comparative) | |
|---|---|---|---|---|
| Run time in h | $H_2O_2$ | MPG[1] | $H_2O_2$ | MPG[1] |
| 5.8 | 0.1 | 20.4 | 0.1 | 19.6 |
| 12.8 | 0.2 | 19.5 | 0.7 | 18.2 |
| 20.0 | 0.2 | 19.9 | 2.2 | 16.9 |
| 26.5 | 0.2 | 19.7 | 2.2 | 16.6 |
| 32.4 | 0.5 | 19.7 | 1.9 | 16.9 |

[1]1,2-propanediol

The results in table 1 show that in example 1, where step e) of the process according to the present invention is performed, the catalyst activity can be maintained for a longer period of time compared to the comparative example 2 without step e), as indicated by a higher and constant conversion of hydrogen peroxide and higher amounts of the product 1,2-propanediol (MPG).

The invention claimed is:
1. A method for the preparation of 1,2-propanediol, comprising:

a) reacting propene with hydrogen peroxide at a temperature of from 50 to 110° C. in the presence of a catalyst mixture, comprising a phase transfer catalyst and a polytungstophosphate, in a liquid reaction mixture comprising an aqueous phase with a maximum apparent pH of 6 and an organic phase, wherein apparent pH refers to a value determined by measurement with a glass electrode employing a commercial pH meter calibrated with aqueous buffer solution of known pH for measuring dilute aqueous solutions;

b) separating the liquid reaction mixture into an aqueous phase ($P_a$) comprising 1,2-propanediol and an organic phase ($P_o$);

c) recycling at least a part of the organic phase ($P_o$) to a); and d) recovering the 1,2-propanediol from the aqueous phase ($P_a$);

wherein the method further comprises at least one of e) reacting a tungstate with hydrogen peroxide and phosphoric acid at a temperature of from 5 to 40° C., in the presence of the phase transfer catalyst, in a liquid mixture comprising an aqueous phase and an organic phase, followed by passing at least a part of a resulting organic phase ($P_{oc}$) comprising polytungstophosphate and the phase transfer catalyst to a).

2. The method of claim 1, wherein in e), the tungstate is reacted with the hydrogen peroxide and the phosphoric acid in the presence of an organic solvent having a boiling point of more than 100° C. at atmospheric pressure and a solubility in water at 20° C. of less than 250 mg/kg.

3. The method of claim 1, wherein at least a part of the organic phase ($P_o$) separated in b) is used as a tungstate source for e), followed by passing the resulting organic phase ($P_{oc}$) to a) to provide for the recycling of c).

4. The method of claim 3, wherein a volume ratio of organic phase to aqueous phase in e) is from 50:1 to 1:1.

5. The method of claim 3, wherein a volume ratio of organic phase to aqueous phase is less than 10:1, and wherein a resulting aqueous phase ($P_{ac}$) and the resulting organic phase ($P_{oc}$) are separated, and a part of the resulting aqueous phase ($P_{ac}$) is reused as a phosphoric acid source for e).

6. The method of claim 1, wherein at least part of a resulting aqueous phase ($P_{ac}$) resulting in e) is passed to a).

7. The method of claim 1, wherein the hydrogen peroxide is used in e) in an amount providing at least 2 mol hydrogen peroxide per mol tungsten.

8. The method of claim 1, wherein in e), the aqueous phase of said liquid mixture comprises from 10 to 40% by weight of the phosphoric acid.

9. The method of claim 1, wherein no propene is added in e).

10. The method of claim 1, wherein in d), the aqueous phase ($P_a$) is subjected to a catalytic hydrogenation prior to recovering the 1,2-propanediol by distillation.

11. The method of claim 1, wherein a) is conducted continuously and a concentration of the hydrogen peroxide in the aqueous phase of a) is from 0.1 to 5% by weight.

12. The method of claim 1, wherein a) is conducted continuously in a loop reactor comprising fixed internals in a tubular section, and the liquid reaction mixture is passed through the loop reactor at a flow rate sufficient to provide turbulent flow at said fixed internals.

13. The method of claim 1, wherein the organic phase in a) comprises an organic solvent having a boiling point of more than 100° C. at atmospheric pressure and a solubility in water at 20° C. of less than 250 mg/kg.

14. The method of claim 1, wherein the phase transfer catalyst comprises at least one selected from the group consisting of a tertiary amine, a tertiary ammonium salt, and a quaternary ammonium salt, and wherein the tertiary amine, the tertiary ammonium salt, and the quaternary ammonium salt each comprises in total at least 12 carbon atoms.

15. The method of claim 14, wherein the phase transfer catalyst comprises a tertiary or quaternary ammonium ion having the structure $R^1R^2R^3NR^{4+}$, wherein $R^1$, $R^2$, and $R^3$ are the same or different and are each an alkyl group having from 8 to 10 carbon atoms, and $R^4$ is hydrogen or methyl.

16. The method of claim 2, wherein the organic solvent comprises more than 50% by weight of at least one alkylated aromatic hydrocarbon having from 8 to 12 carbon atoms.

17. The method of claim 4, wherein the volume ratio of organic phase to aqueous phase in e) is from 14:1 to 8:1.

18. The method of claim 5, wherein the volume ratio of organic phase to aqueous phase is from 7:1 to 0.1:1.

19. The method of claim 8, wherein in e), the aqueous phase of the liquid mixture comprises from 18 to 35% by weight of the phosphoric acid.

20. The method of claim 13, wherein the organic solvent is a mixture of alkylated aromatic hydrocarbons having 8 to 12 carbon atoms.

\* \* \* \* \*